United States Patent
Bardehle

(10) Patent No.: US 7,027,435 B2
(45) Date of Patent: Apr. 11, 2006

(54) METHOD AND DEVICE FOR CALL DIVERSION VIA AN AGENT IN A COMMUNICATIONS SYSTEM

(75) Inventor: Lutz Bardehle, Salzkotten (DE)

(73) Assignee: Siemens Aktiengesellschaft, Munich (DE)

( * ) Notice: Subject to any disclaimer, the term of this patent is extended or adjusted under 35 U.S.C. 154(b) by 901 days.

(21) Appl. No.: 09/998,066

(22) Filed: Nov. 29, 2001

(65) Prior Publication Data

US 2002/0136182 A1 Sep. 26, 2002

(30) Foreign Application Priority Data

Nov. 29, 2000 (DE) .................. 100 59 175

(51) Int. Cl.
*H04L 12/66* (2006.01)
*H04M 3/42* (2006.01)

(52) U.S. Cl. .................. 370/352; 379/211.01
(58) Field of Classification Search ............ 370/220, 370/221

See application file for complete search history.

(56) References Cited

U.S. PATENT DOCUMENTS 6,603,849 B1 * 8/2003 Lin et al. ............ 379/211.01

* cited by examiner

*Primary Examiner*—Chi Pham
(74) *Attorney, Agent, or Firm*—Bell, Boyd, & Lloyd LLC

(57) ABSTRACT

A method and device for call diversion in a communications system with a multiplicity of terminals which are connected to a local area network, the information relating to an activated call diversion being transmitted to an agent unit, and a call being diverted using the transmitted information.

7 Claims, 6 Drawing Sheets

METHOD AND DEVICE FOR CALL DIVERSION VIA AN AGENT IN A COMMUNICATIONS SYSTEM

BACKGROUND OF THE INVENTION

To date, local area networks (LANs) basically have been used for connectionless transmission of data packets between computers. With the integration of the computer into communications services, not only data, but also voice and image information increasingly are transmitted via local area networks. The standard ITU-T H.323, for example, describes interfaces, necessary units and processes for packet-based multimedia communications systems.

FIG. 6 shows the basic structure of a device according to H.323. The terminals 61, 62 and 63, the gateway 64, the gatekeeper 66 and the multipoint control unit (MCU) 65 are connected to the packet-based network 60. The terminals 61–63 can communicate with one another via the network 60. To do this, however, they must register with the gatekeeper 66 and request transmission capacity (bandwidth) from it. The gateway 64 forms the interface between the device and other networks. The MCU 65 is defined in the H.323 standard for conference circuits.

In contrast to conventional terminals in communications systems, a computer, for example, can be disabled as a terminal and thereafter can no longer be contacted in the communications system. A call diversion is proposed in the standard H.450.3 which refines H.323, but the case of a terminal device which can be disabled is not taken into account. Therefore, if a terminal is disabled following activation of a call diversion, the call diversion is lost.

An object of the present invention is, therefore, to provide a method and a device which guarantee a call diversion, even for terminals which can be disabled in a communications system.

SUMMARY OF THE INVENTION

According to the present invention, in a communications system with a multiplicity of terminals which are connected to a local area network (LAN), a call diversion is activated from a first terminal to a second terminal, information relating to the call diversion is signaled to an agent unit, whereupon a call is diverted for the first terminal using the transmitted information. According to the present invention, a computer-controlled device in a communications system includes a multiplicity of terminals which are connected to a local area network, and furthermore an agent unit, which manages call diversions of the terminals. Pursuant to this method and this device, a call diversion is possible even after the first terminal has been disabled.

According to a preferred design of the method, the H.323 protocol is used in the communications system. Standardized interfaces and methods can thereby be used for communication.

It is particularly appropriate if the agent unit is a third terminal of the communications system, since no additional higher-order units are thus required.

According to a further preferred embodiment of the method, the agent unit stores a list of the terminals registered in the LAN. The agent unit can thereby initiate a call diversion without having to attempt to communicate with the first terminal.

Additional features and advantages of the present invention are described in, and will be apparent from, the following Detailed Description of the Invention and the Figures.

DETAILED DESCRIPTION OF THE INVENTION

Figure 1:
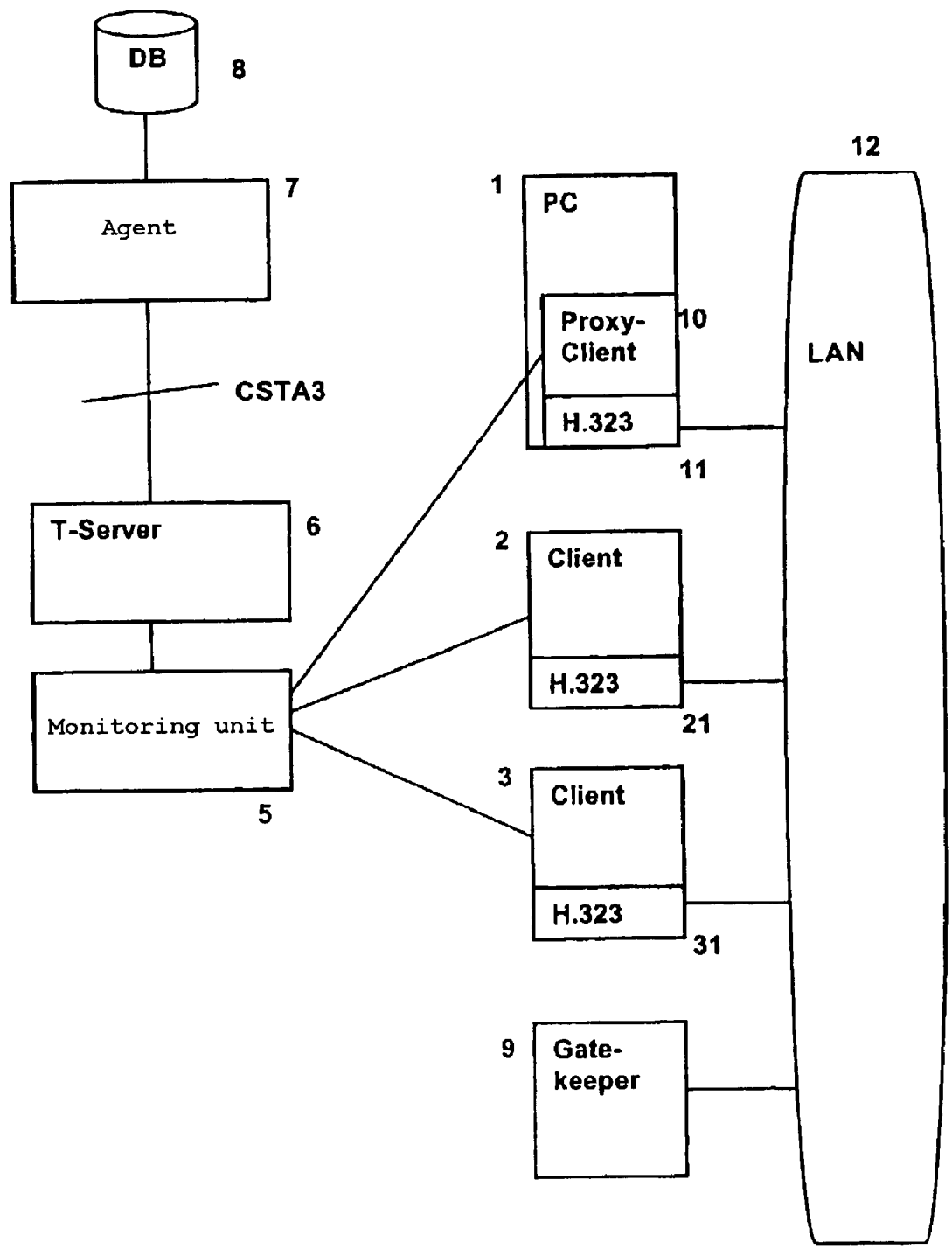
FIG. 1 shows a schematic representation of a device according to the present invention with an agent unit.
Figure 2:
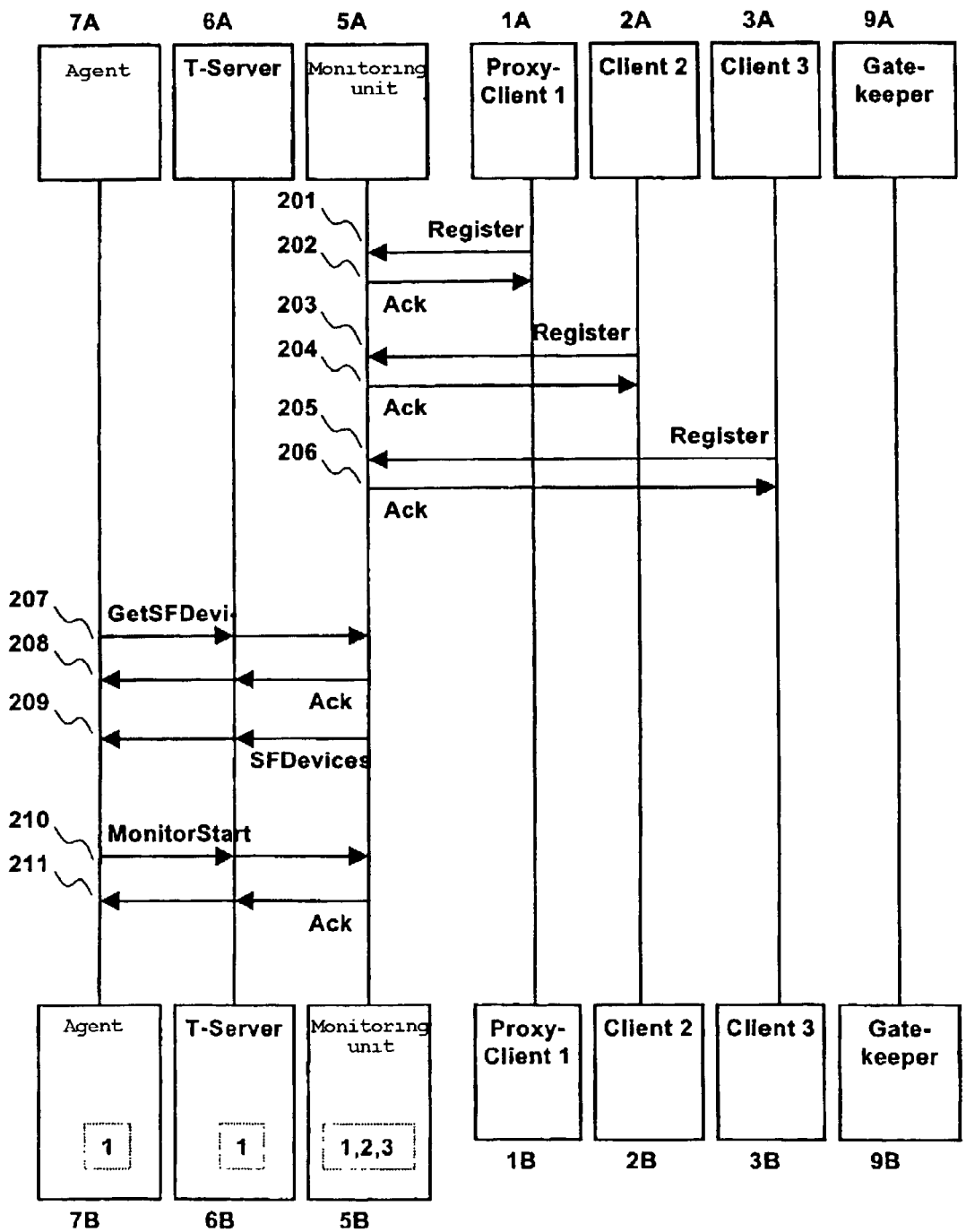
FIG. 2 shows a flow chart for an initialization phase in the communications system corresponding to FIG. 1.

A preferred embodiment of the device according to the present invention is shown in FIG. 1. A PC as a terminal 1 is connected via its H.323 interface 11 as a proxy client 10 to the local area network (LAN) 12. Two further terminals 2, 3 are connected as clients to the LAN 12 via their respective interfaces 21, 31. All terminals 1 to 3 are connected to the monitoring unit 5 which, in turn, is connected via a T-server 6 and a CSTA3 interface to the agent unit 7 along with the associated database 8. The activated call diversions, which are transmitted from the terminals 1–3 via the monitoring unit 5 and the T-server 6 to the agent 7, are stored in the database. The monitoring unit 5 monitors the terminals registered in the LAN and all calls and connections in the LAN. The T-server 6 may, for example, be a central telephone system with a connection to the public or local telephone network, or a telephone server; for example, a "Computer Telephony Integration" (CTI) server with a connection to a central telephone system. The arrangement shown in FIG. 2 is also referred to Asia "third-party" or central solution. A more detailed description of a device of this type can be found in the earlier patent application DE 199 47 032.

The following phases are shown in FIGS. 2 to 5 for the device from FIG. 1:

Initialization in FIG. 2;
Activation of a call diversion in FIG. 3;
Call from a fourth terminal to the diverting terminal in FIG. 4; and
Call diversion in FIG. 5.

The flow charts, in each case, show the exchange of messages between the terminals 1 to 4, the gatekeeper 9, the monitoring unit 5, the T-server 6 and the agent 7. For each unit, a start and end status are indicated by the reference symbol of the unit extended by a letter (e.g., terminal 1 in FIG. 2: 1A=>1B). Furthermore, the following simplifications are undertaken in FIGS. 2 to 5 and their description: a message which is forwarded with its content unchanged from one unit to the next is indicated by two arrows, but only one reference symbol. Simple acknowledgement messages (e.g., Ack 313) are not described in detail.

FIG. 2 shows how the terminals 1 to 3 successively register themselves with the monitoring unit 5 via the messages 201, 203, 205, which are acknowledged by the messages 202, 204, 206. The terminal 1 informs the monitoring unit 5 of its characteristic that it serves in the local area network 12 as a proxy client. With the message 207, the agent 7 requests the list of registered terminals from the monitoring unit 5 via the T-server 6. Following an acknowledgement message 208, the list of registered terminals (1 to 3) is transferred with the message 209 from the monitoring unit 5 to the agent 7. The agent 7 prompts the monitoring unit 5 with the message 210 to start monitoring the proxy client (terminal) 1. Acknowledgement is provided back to the agent via message 211.

The monitoring unit 5, beginning with its start status 5A, has therefore attained the end status 5B in FIG. 2. In the status 5B of the monitoring unit 5, the digits 1 to 3, in the broken-line box of the monitoring unit 5, indicate the fact that the terminals 1 to 3 are registered in the monitoring unit, and the emboldened digit 1 indicates the fact that the terminal 1 has been registered as a proxy client.

Figure 3:
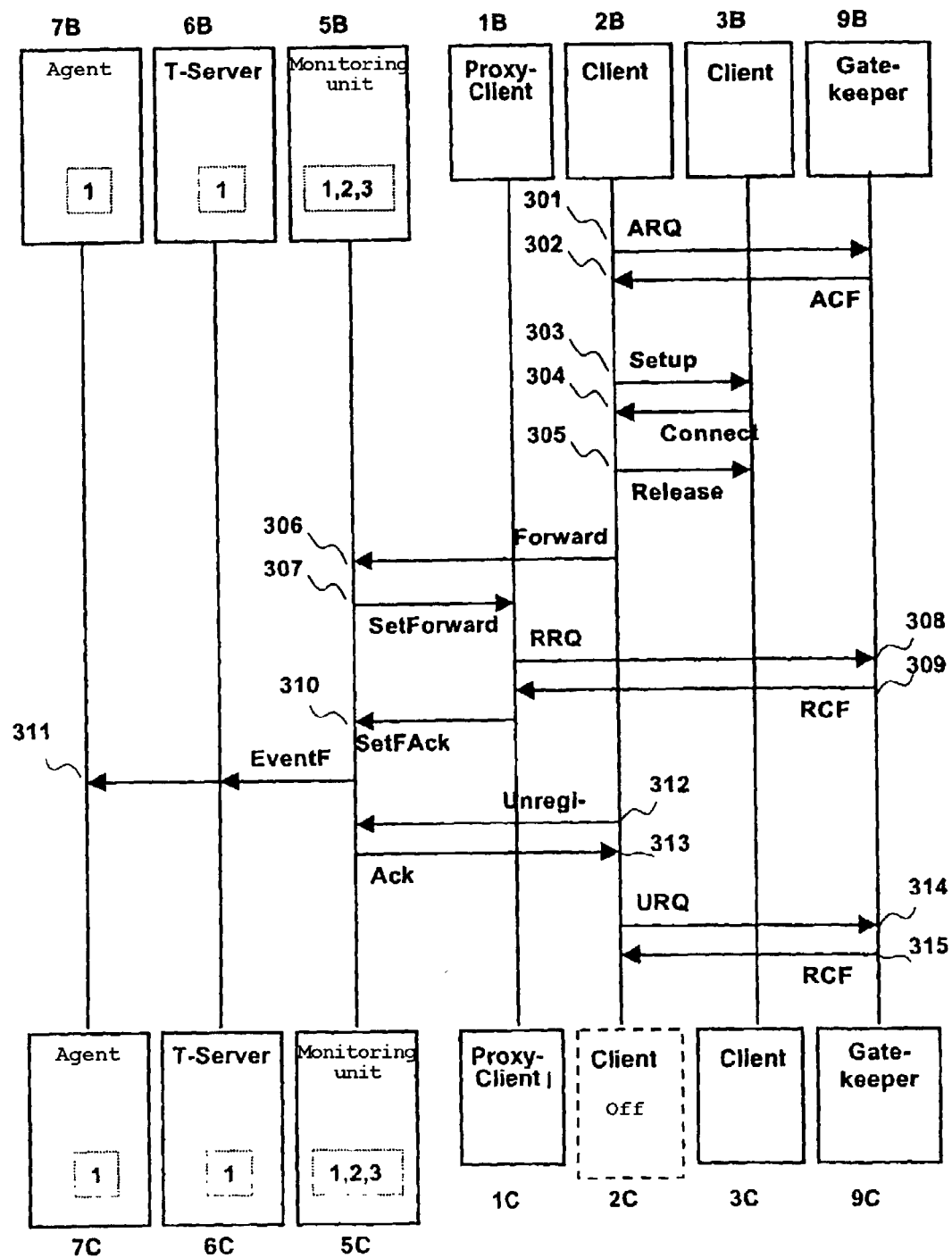
FIG. 3 shows a flow chart for the activation of a call diversion and disablement of the first terminal in the communications system from FIG. 2.

FIG. 3 shows the activation of the call diversion from the terminal 2 to the terminal 3, and the disablement of the terminal 2. With the access inquiry 301, the terminal 2 requests the address of the terminal 3 from the gatekeeper 9. Gatekeeper 9 responds to the terminal's request via message 302. Thereafter, the terminal 2 requests the set-up of a connection to the terminal 3 via the message 303. The terminal 3 sets up this connection in the step 304, providing the terminal 2 with status information which includes, for example, restrictions. The terminal 2 then clears down the connection to the terminal 3 with the message 305. With the message 306, the terminal 2 informs the monitoring unit 5 of an active call diversion from terminal 2 to 3 of the "instant call diversion" type. The monitoring unit 5 transmits this information to the terminal 1 with the message 307, whereupon the terminal 1 informs the gatekeeper 9 via a registration inquiry 308 of the list of diverted terminals. Following the reply 309 of the gatekeeper 9, the terminal 1 acknowledges the call diversion to the monitoring unit 5 with the message 310. With the message 311, the monitoring unit forwards the information relating to the call diversion via the T-server 6 to the agent 7. With the unregistration message 312 and its acknowledgement 313, the terminal 2 unregisters from the monitoring unit 5, in order to cease operation following the unregistration 314 and its acknowledgement 315 for the unregistration from the gatekeeper 9. The only change which is shown from status B to status C of the units in FIG. 3 is the disablement of the terminal 2.

Figure 4:
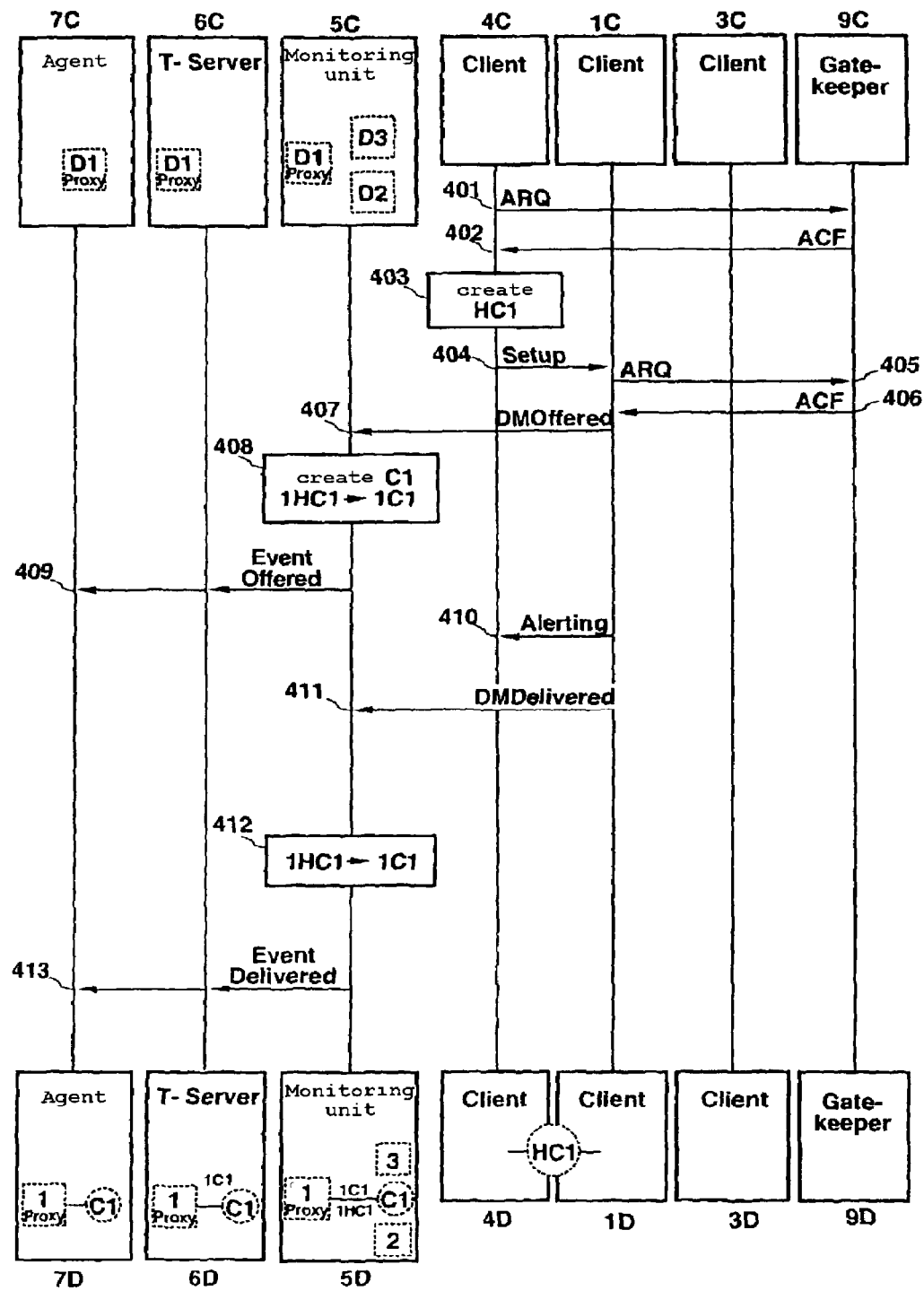
FIG. 4 shows a flow chart for an incoming call from a terminal in the communications system from FIG. 3.

FIG. 4 shows an incoming call from a terminal 4 for the terminal 2 in its message sequence, whereby the units switch from status C to status D. The terminal 4 sends an access inquiry 401 to the gatekeeper 9 and, with the acknowledgement 402, receives "D1 or proxy" as the destination address. Thereupon, the terminal 4 creates an H.323 call identification number (call ID) HC1 in the step 403. With the call ID HC1, the terminal 4 requests the set-up of a connection from the terminal 1 in the message 404, whereupon the terminal 1 requests the bandwidth from the gatekeeper 9 in the request inquiry 405, which is acknowledged with the message 406. The terminal 4 informs the monitoring unit 5 in the message 407 of the H.323 call ID HC1, whereupon the monitoring unit 5 creates a call ID C1 (408) for the "Computer Supported Telecommunications Applications" (CSTA) interface and links C1 with HC1. With the message 409, the monitoring unit 5 notifies the agent 7 via the T-server 6 of the offered connection C1 to the terminals involved. With the message 410, the terminal 1 alerts the terminal 4 and informs the monitoring unit of this process in the message 411. The monitoring unit sends an acknowledgement in the step 412, replaces C1 with HC1 and, with the message 413, forwards the information relating to the connection set up between the terminal 1 and the terminal 4 to the agent 7. In status D of the units involved, the connection of the terminal 1 is shown with the call ID C1 in the agent 7, and also in the T-server 6 and in the monitoring unit 5, the information relating to the link between the CSTA call ID C1 and the H.323 call ID HC1 also being shown in the monitoring unit. The connection HC1 is shown between the terminals 1 and 4 in the statuses 4D and 1D.

Figure 5:
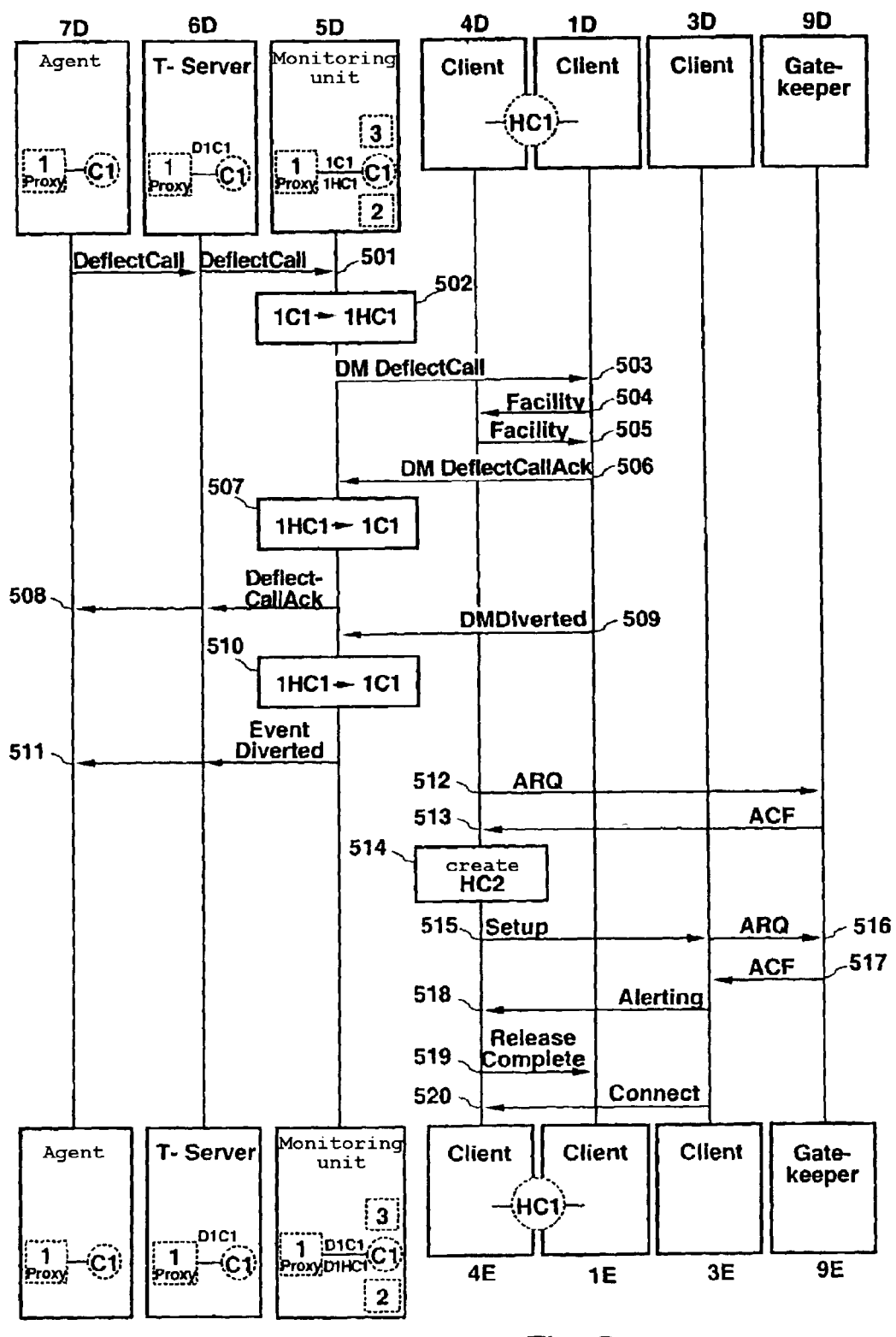
FIG. 5 shows a flow chart for the call diversion according to the present invention in the communications system from FIG. 4.
Figure 6:
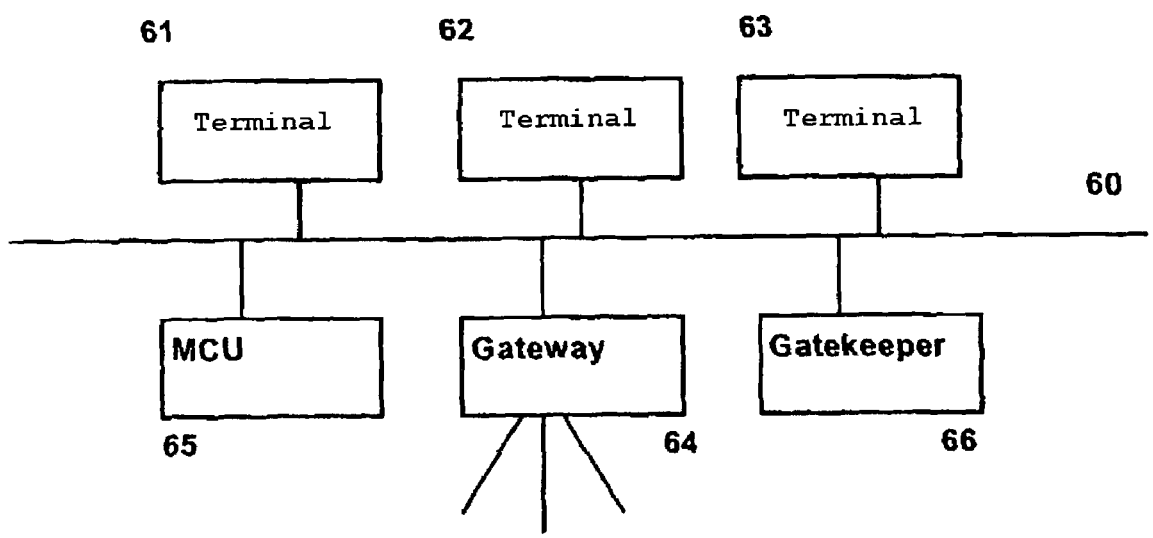
FIG. 6 shows a schematic representation of a device with units according to H.323.

FIG. 5 shows the diversion of the call from FIG. 4. With the step 501, the agent 7 notifies the monitoring unit 5 of the call diversion by providing it with the new destination address (terminal 3). In the step 502, the C1 is replaced by the HC1 in order to then forward the message 503 from the monitoring unit 5 to the terminal 1. With the message 504, the terminal 1 invokes a call diversion function in the terminal 4, which is acknowledged with the message 505. The terminal 1 then acknowledges the call diversion to the monitoring unit 5 for HC1 506. HC1 is, in turn, converted to C1 in the step 507, in order to be forwarded to the agent 7 with the message 508 as an acknowledgement of the call diversion. With the message 509, the terminal 4 informs the monitoring unit 5 of the effected call diversion with detailed information concerning the call diversion which, following the conversion step 510, is forwarded to the agent 7 in the message 511. In the step 512, the terminal 1 requests a bandwidth for the connection to the terminal unit 3, which is acknowledged with the message 513. Following the generation of a second H.323 call ID HC2 for the connection to the terminal 3 in the step 514, the set-up of the connection is requested with the message 515. The terminal 3 sends an access inquiry 516 to the gatekeeper 9 which is acknowledged with message 517. Terminal 3 then alerts the terminal 4 to the second call ID HC2 518. With the message 519, the terminal 4 clears down the connection to the terminal 1 with the call ID HC1 and, finally, the connection HC2 is set up between the terminal 3 and the terminal 4 with the message 520.

In a further design of the method, the terminal 1, for example, is simultaneously the agent unit and performs its tasks. This arrangement is also referred to as a first-party or single-station solution.

Although the present invention has been described with reference to specific embodiments, those of skill in the art will recognize that changes may be made thereto without departing from the spirit and scope of the invention as set forth in the hereafter appended claims.

The invention claimed is:

1. A method for call diversion in a communications system with a plurality of terminals which are connected to a local area network, the method comprising the steps of:
   activating a call diversion from a first terminal to a second terminal;
   transmitting information relating to the activated call diversion to an agent unit; and
   diverting a call for the first terminal using the transmitted information, wherein information is transmitted to the agent unit in a protocol layer above an H.323 protocol.

2. A method for call diversion in a communications system as claimed in claim 1, wherein an H.323 protocol is used in the communications system.

3. A method for call diversion in a communications system as claimed in claim 1, wherein the agent unit is a third terminal of the communications system.

4. A method for call diversion in a communications system as claimed in claim 1, wherein the first terminal can be disabled.

5. A method for call diversion in a communications system as claimed in claim 1, wherein the agent unit stores a list of the plurality of terminals connected to the local area network.

6. A method for call diversion in a communications system as claimed in claim 5, wherein the agent unit controls the call diversion.

7. A computer-controlled device in a communications system, comprising:
   a plurality of terminals connected to a local area network; and
   an agent unit for managing call diversions of the terminals, wherein the agent unit receives information relating to an activated call diversion from one of the plurality of terminals in a protocol layer above an H.323 protocol, and wherein the agent unit diverts a call from the terminal using the received information.

* * * * *